[11] 3,627,429

[72] Inventors Richard A. Jaenicke
 San Francisco;
 Raymond A. Evanson, El Cerrito, both of Calif.
[21] Appl. No. 752,700
[22] Filed Aug. 14, 1968
[45] Patented Dec. 14, 1971
[73] Assignee Spectra-Physics, Inc.

[54] LASER OPTICAL SURVEYING INSTRUMENT AND METHOD
 9 Claims, 5 Drawing Figs.
[52] U.S. Cl. .................................................. 356/153, 33/46.2, 331/94.5
[51] Int. Cl. ............................................ G01b 11/27
[50] Field of Search ........................................ 331/94.5; 356/138, 153; 350/6

[56] References Cited
UNITED STATES PATENTS

| | | | |
|---|---|---|---|
| 1,689,847 | 10/1928 | Zworykin | 350/6 |
| 3,237,518 | 3/1966 | Krajowsky et al. | 356/138 |
| 3,392,260 | 7/1968 | Dernbach | 331/94.5 |
| 3,454,898 | 7/1969 | Comstock | 331/94.5 |
| 3,499,713 | 3/1970 | Ito | 356/138 |

OTHER REFERENCES

Northend et al., Review of Scientific Instruments, Vol. 37, #4, 4/66, pp. 393–400.

*Primary Examiner*—Ronald L. Wibert
*Assistant Examiner*—J. Rothenberg
*Attorneys*—Warren M. Becker and Jerold E. Rosenblum

ABSTRACT: A laser surveying instrument including a telescope and a laser head coupled together with movable optics for directing the output beam from the laser head into the eyepiece and through the telescope after routine sighting.

LASER OPTICAL SURVEYING INSTRUMENT AND METHOD

BACKGROUND OF THE INVENTION

This invention relates to optical surveying instruments and method and more particularly to the use of laser beams in surveying applications.

Heretofore, it has been proposed that laser beams be used alongside or parallel with a standard surveying instrument to mark the sightline of the instrument between itself and the remote position to which it is aimed. With a typical transit, parallel mounting of the laser requires a difficult and precise factory alignment of the laser output beam and the transit sightline. Even so, parallax remains as an inherent fault which requires correction.

A further difficulty results from the need for separate focusing controls on the transit and laser; the transit being optically focused with reference to the transitman's visual observation through the transit telescope, while the laser is focused by separate means. There is, therefore, a need for a new and improved laser optical surveying instrument and method. As used herein, the terms transit and surveying instrument are intended to include all surveying means having a defined line of sighting which the user visually aligns on an exact position at a remote location. Typically, such instruments include a high power telescope and means for establishing horizontal or vertical bearings related to the attitude of the telescope. Such instruments go under a variety of names such as alidades, levels, theodolites and transits.

SUMMARY OF THE INVENTION AND OBJECTS

It is the general object of the present invention to provide a new and improved laser optical surveying instrument and method which will overcome the above-mentioned limitations and disadvantages.

Another object of the invention is to provide a laser surveying instrument and method of the above character which utilizes a transit telescope to focus a laser beam on a remote position.

Another object of the invention is to provide a laser surveying instrument and method of the above character in which the laser beam is routed through the optical system of the transit and is automatically aligned on the sightline of the transit without parallax.

Another object of the invention is to provide a laser surveying instrument and method of the above character in which the transitman's visual operation and focusing of the transit telescope also serves to automatically focus the laser beam on the location being sighted.

Another object of the invention is to provide a laser optical surveying instrument of the above character which is free of parallax error and which does not require separate collimating optics or separate focusing means.

In general, a preferred form of the present invention includes a standard transit or surveying instrument including a tripod, leveling head, horizontal and vertical circle assemblies, and telescope. The transitman uses the transit in a conventional manner to bring an exact position at a remote location into focus and registry on the reticle or cross hairs of the transit telescope. A laser head or assembly is mounted to the transit so that its beam emerges adjacent the telescope eyepiece. Diverting or rerouting optics are provided for selectively coupling the laser beam into the eyepiece. The routing optics are mounted so that they can be moved out of the way to permit the conventional sighting by the transitman or swung into a position for directing the laser beam into the eyepiece. When so directed, the laser beam traverses the telescope from the eyepiece and emerges from the objective lens directed along the sightline of the instrument to the exact position at the remote location previously sighted without any further essential adjustment or compensation on the part of the transitman.

These and other features and objects of the invention will become apparent from the following description and claims when taken together with the accompanying drawings.

BRIEF DESCRIPTION OF THE DRAWINGS

Referring to the drawings:

FIG. 3 is a cross-sectional view taken along the lines 3—3 of FIG. 2.

FIG. 4 is an end view taken along the lines 4—4 of FIG. 2.

FIG. 5 is an exploded view of the mounting bracket arrangement of the instrument of FIG. 1.

DETAILED DESCRIPTION OF THE PREFERRED EMBODIMENT

Figure 1:
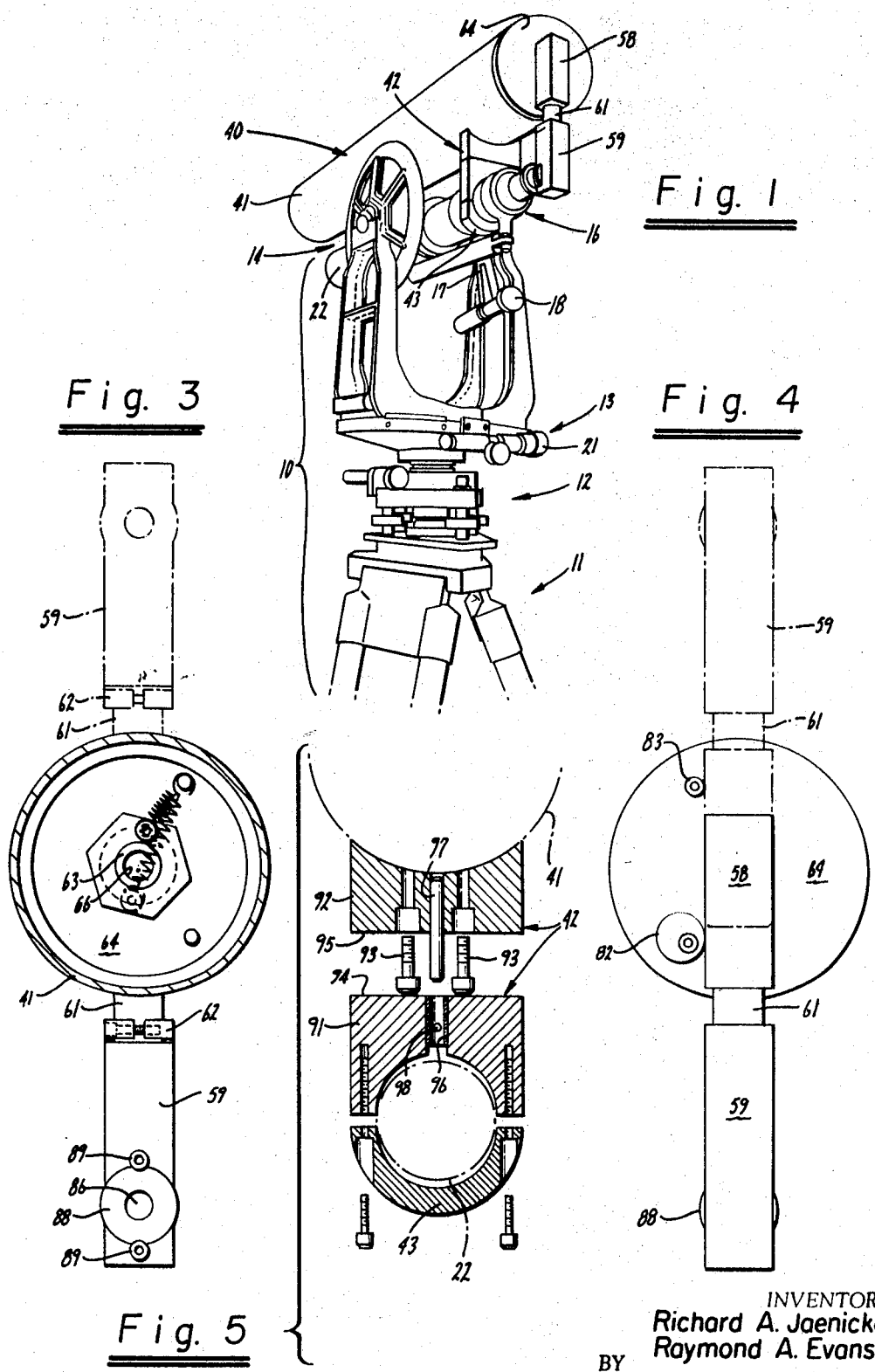
FIG. 1 is a perspective view illustrating a laser optical surveying instrument constructed according to the invention.

Referring particularly to the FIGS., the laser surveying instrument of the present invention is shown in a preferred form and includes a conventional transit 10 having a tripod stand 11 supporting a leveling head 12, horizontal and vertical circle assemblies 13 and 14 and a telescope 16. Telescope 16 is precisely adjustable in both vertical and horizontal directions by means of a vertical circle telescope clamp 17 and tangent screw 18 and a horizontal circle clamp (not shown) and horizontal tangent screw 21. The remaining parts and the operation of the transit and leveling and circle adjustments are conventional and are set forth in detail in texts on surveying instruments. The transit shown in the drawing is K & E Paragon (Trademark) model sold by Keuffel and Esser Company. It will be understood however that other types of surveying instruments are entirely suitable to be used in the present invention and that the depiction of a particular model of transit herein should be taken as purely for the sake of illustration.

Figure 2:
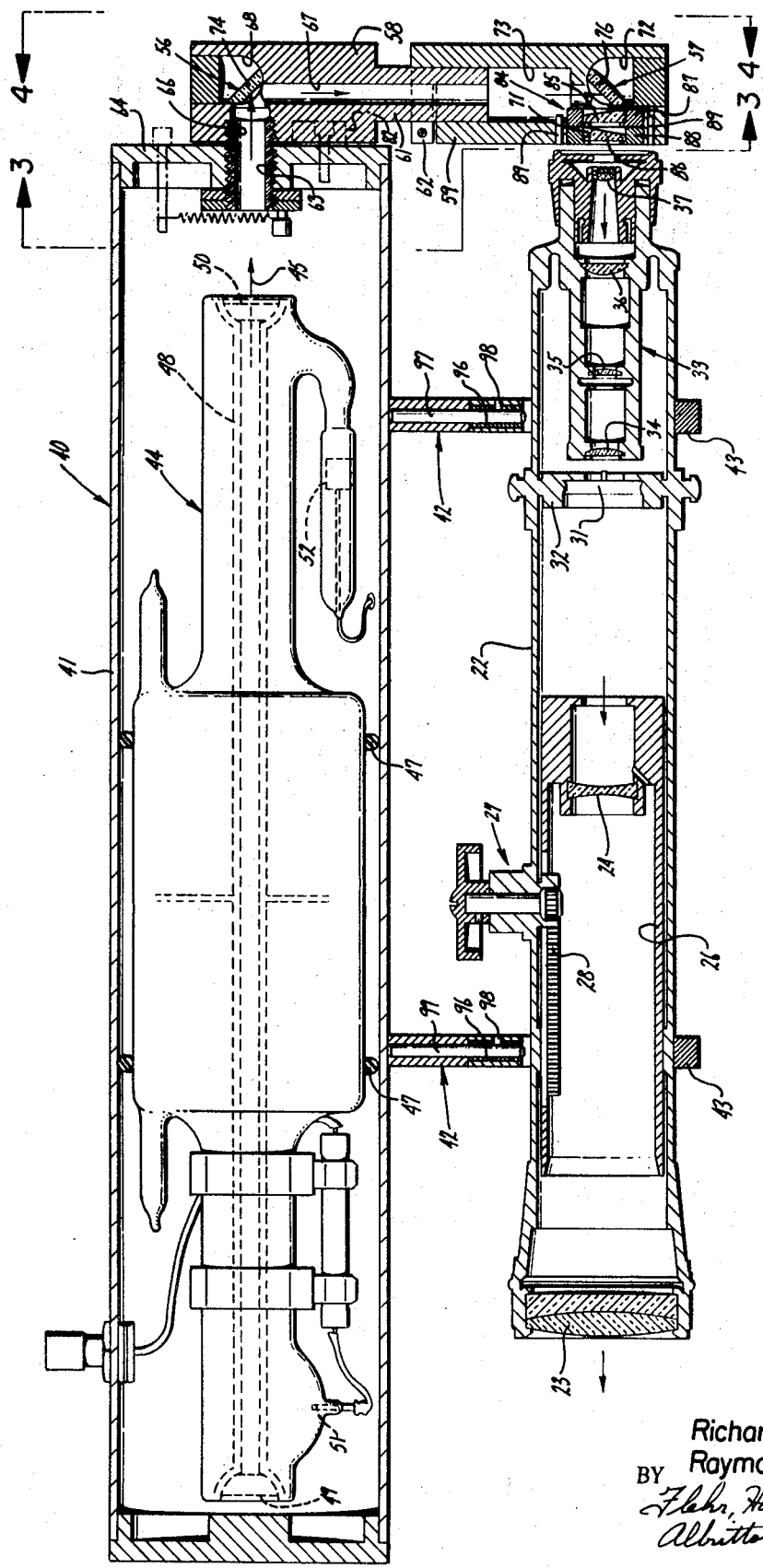
FIG. 2 is an elevational view in cross section of the telescope, laser assembly, and routing optics of the instrument of FIG. 1.

The telescope optics of the transit are shown in detail in FIG. 2 and consist of a linear arrangement of lenses supported in a telescope barrel 22. The lenses include an objective lens 23 and a focusing lens 24 mounted in a focusing draw tube 26 arranged for sliding motion towards or away from objective lens 23 by means of an adjusting pinion 27 which engages a rack gear 28 attached to the draw tube. There is also provided a reticle 31 (or cross hairs) set in an adjustable mounting 32 and eyepiece lens assembly 33 for viewing the image formed by the focusing lens 24. The eyepiece lens assembly includes stationary lenses 34, 35, 36 and an adjustable lens 37 which is movable with respect to the stationary lenses.

A laser assembly 40 including a supporting cylinder 41 of metal is mounted on the top of the telescope on brackets 42 secured to the telescope barrel 22 by clamps 43 and screws (not shown). The assembly 40 includes a laser tube 44 which may be of any suitable type having an output beam 45 in the visible such as helium-neon gas laser having an output of a few milliwatts at 6,328 Angstroms. The construction of such lasers is known and, for example, may be of the type shown and described in commonly assigned copending U.S. Pat. application by Henry Rhodes, Ser. No. 581,556, filed Sept. 23, 1966, and entitled LASER OPTICAL CAVITY AND ALIGNMENT METHOD.

The laser tube 44 is mounted on flexible O-rings 47 which fit snugly between it and the cylinder 41 to protect it from shock. Laser tube 44 serves to contain the helium-neon gas mixture and includes a coaxial capillary 48 terminated at the ends of the tube on reflectors 49, 50 which define an optical cavity causing the light emitted from within the gaseous mixture in the capillary to be reflected back and forth and cause a buildup of coherent oscillations. Reflector 50 is partially transmissive so that laser output beam can be extracted from that end of the laser tube adjacent the eyepiece of the telescope. A suitable power supply (not shown) and electrodes 51 and 52 are provided for energization of the gas in laser tube. It will be understood that many types of laser tubes and mounting arrangements are suitable for use with the present invention and that the disclosure of a particular laser tube and mounting herein should be understood to be primarily for the purpose of illustrating a preferred form of the invention.

Routing optics are provided for optically diverting the output beam 45 from the laser into parallel alignment with the optic axis of the telescope and into the eyepiece lens 37. As the beam traverses at the telescope optics, from the eyepiece lens to the field or objective lens, it is collimated, focused and aimed by the telescope to the exact position previously formed by the coincidence of the reticle on the sighted position at the remote location. The routing optics are selectively operable so that the beam can be either directed through the transit telescope or moved out of the way together with the routing means thereby making the transit available for conventional sighting by the transitman.

The routing optics consists of an optical reflecting system including a pair of reflectors 56, 57, which divert the direction of the beam and effect a linear displacement of the beam from the laser output position to the position of the eyepiece. The reflectors are set in a pair of reflector mounting blocks 58, 59 adjustably interconnected by a stem 61 formed on one of the blocks and a locking clamp 62 formed on the other into which the stem is set for sliding motion to permit adjustment of the spacing between the blocks. Block 58 is supported on a sleeve 63 which engages end plate 64 provided on the laser head. Block 58 is provided with a first passageway 66 generally parallel to and aligned with the emerging laser beam and is provided with a second transfer passageway 67 which intersects passageway 66 at a right angle. A recess 68 having a spherical bottom is formed in the block in general alignment with passageway 67 and intersects both passageways 66 and 67 in such a manner that a light can be reflected between them by positioning and adjusting reflector 56 in the recess.

Similarly, block 59 is provided with an output passageway 71 in parallel alignment with the optic axis of the telescope, a recess 72, and a transfer passageway 73 which faces toward and connects with the transfer passageway 67 of block 58 to form a straight path for the transfer of the laser beam between blocks, and, reflector 59 is so disposed in recess 72 that the light beam is reflected from passageway 73 to passageway 71.

Reflectors 56, 57 preferably take the form of mirror surfaces formed on the smaller faces of substrates 74, 76 having the shape of segments of spheres of the same radius as the bottom recesses 68, 72 into which they are set. This permits the mirror surfaces to be adjusted to the optimum angular orientation with respect to each other and the passageways so that the full width of the laser beam is diverted through the routing optics. Suitable means is provided for securing the substrates in a position during and after adjustment and can consist of a suitable adhesive interposed between the substrate back or sidewall surfaces and the supporting spherical recess. Preferably, the adhesive is of a type which sets up to maintain permanent adjustment of the substrates, such as an epoxy. As shown, access to each of the mirror substrates for adjustment is provided through a cylindrical section of each recess which continues to the end of the respective block and which can be sealed with a plug after substrate adjustment.

The stem and clamp collar connection 61, 62 between the blocks permits them to slide with respect to each other so that the vertical distance between the input and output passageways can be adjusted to correspond to precise displacement between the laser beam and the eyepiece. Rotational positioning of the free end of the routing optics at the lower limit is controlled by an eccentrically mounted stop 82 screwed to end plate 64. By rotating the stop and making it fast, exact control is obtained of the downward limit of movement of the routing optics as it is rotated into conjunction with the telescope eyepiece. Another stop 83 is fastened to the end plate and limits the movements of the routing optics when it is rotated out of the way of the eyepiece.

When the diverted and redirected laser beam is about to emerge from the routing optics, it is given final alignment through a small solid angle with a variable power prism 84 consisting of a pair of prisms or optical wedges 85, 86 set in the cylindrical collars 87, 88 mounted in spaced parallel planes. The collars can be rotated either independently in opposite directions or together to provide the equivalent of a single prism of variable power and directivity. Rotation of these prisms permits exact alignment of the laser beam through the telescope and onto the exact position of the target. Set screws 89 are provided for clamping the collars 87, 88 in a fixed position after adjustment.

When the telescope is focused on a remote location, the image rays emerging from the telescope will be approximately parallel or focused at infinity. Then, when the parallel rays of the laser beam are directed through the telescope at that setting, they are automatically converged or focused onto the exact position. Where the exact position is only an intermediate point along a line of positions where the beam is to run, the telescope focusing lens 24 can be reset after sighting, to focus on infinity. Although this increases the width of the beam at near position along the line of sight, it also represents the optimum (minimum) divergence figure that can be obtained; for, when focused to infinity, the convergence of the beam is improved by a factor equal to the magnification of the telescope.

In situations wherein uncorrected vision might select an eyepiece adjustment not yielding parallel rays, fiducial marks can be etched into the eyepiece collars which can be aligned to obtain such rays. The effect this has on overall focus is small and a correction is easily found by observation of an amount of refocus required for a given individual to obtain minimum beam diameter at the remote location.

The assembly and operation of the instrument of the present invention is very convenient and rapid. The brackets 42 for holding the laser to the transit telescope are mounted loosely to the telescope barrel 22 and the laser assembly 40 is positioned so that the routing optics clears the telescope eyepiece when it is fully withdrawn. The brackets are then tightened. The routing optics are then shifted into the lower position to image the laser beam through the telescope. A convenient flat surface is placed about a foot in front (facing the field lens) of the transit telescope to intercept the beam and form an observable spot. If the spot is circular, it indicates that the laser beam is centered in the transit telescope. If it is not centered, it will appear noncircular and can then be centered by adjustment of stem and clamp 61, 62 for vertical adjustment and by rotation of the eccentric stop 82 for rotational adjustment.

Thereafter the routing optics are moved to the upper position out of the way of the transit telescope so that the transit can be sighted in a conventional fashion (as shown in broken lines in FIGS. 3 and 4) to bring the reticle into coincidence on an exact position at a remote location. After sighting, the routing optics are shifted into the lower position to direct the laser beam through the telescope and onto the remote location. The position where the beam strikes the remote location is noted. The variable power prism 84 is then adjusted to center the laser beam on the exact position previously found and screws 89 and tightened. This completes a nonrecurring setup of the instrument. Thereafter, the transitman merely rotates the routing optics out of the way of the telescope for conventional sights. Whenever the laser beam is desired, the routing optics are lowered against the stop and the prealigned beam is directed through the telescope and is automatically centered on the exact position without any further adjustment, as for parallax, or refocusing being required. Thus, in the field, the transitman need not bring any effort to bear in focusing or adjustment of the laser system, since it is completely prealigned and brought to focus at the remote location by the prior steps of aligning the transit on the exact location in the usual manner.

FIG. 5 shows one of the brackets 42 by which the laser assembly is readily attached or detached from the transit telescope while maintaining prealignment. As shown, bracket 42 includes a lower bracket 91 secured to the transit telescope by claim 43, and an upper bracket 92 secured to the laser assembly head, each with suitable fastenings, such as screws 93. Lower bracket is provided with a flat upper surface 94 and upper bracket is provided with a mating flat lower 95 adapted to rest upon and be supported by the upper surface. Precision positional alignment is obtained by a precision bushing 96 formed or inserted in bracket 91 and a mating pin 97 set into bracket 92. After assembly, brackets 91, 92 are held together by a set screw 98 which intersects the path of the pin below the bushing. Thus, after prealignment, and when not required, the laser assembly is easily removed from the transit by merely loosening the set screws 98. The laser assembly is repositioned to the transit by aligning pins 97 and bushings 96 while lowering the laser until surfaces 94, 95 make contact. Set screws are then retightened. With this system, precision and reproducible reassembly of the parts is obtained and no optical realignment is required after each removal and reattachment of the laser assembly to the transit.

The following data indicate the operating characteristics of a surveying instrument constructed in accordance with the invention.

Output power: 2.5 milliwatts continuous duty red light at 6,328 Angstroms.

Laser Beam Diameter: The following chart gives the beam diameter at distances up to 10,000 feet.

| Distance from laser, feet | Beam diameter, inches |
|---|---|
| 10 | 0.01 |
| 50 | 0.04 |
| 100 | 0.08 |
| 500 | 0.4 |
| 500 | 0.4 |
| 1,000 | 0.8 |
| 5,000 | 4.0 |
| 10,000 | 8.0 |

Add 4.0 inches to the diameter for each 5,000 feet of distance.

The above represents minimum beam diameter achieved when the transit telescope is set for visual clarity. Alternatively, the telescope may be set at infinity focus in which case the beam is initially 1.3 inches in diameter and increases one inch for each 1,000 feet of distance. (e.g. Diameter at 1,000 feet is 2.3 inches).

Thus, there has been provided a novel surveying instrument preferably utilizing a laser beam which is particularly convenient to operate and which provides for extremely good alignment of the laser beam into exact registry with the vertical and horizontal axes of the transit and into exact coincidence with a previously sighted exact position at a remote location. By using the principles of the present invention, problems of parallax and laser beam focus are eliminated while at the same time saving the necessity of providing separate optics for the laser.

To those skilled in the art to which this invention relates many changes, applications and modifications of the invention will suggest themselves without departing from its spirit and scope. Accordingly, it is to be understood that the disclosure and description herein is to be taken as illustrative of the invention and not as a limitation thereon.

We claim:

1. A laser surveying instrument comprising a telescope including a reticle for accurately aligning said telescope on an exact position at a remote location to establish an optical sightline between said reticle and said location, said telescope conveying the image light from said remote location into a bundle of light rays emerging from the eyepiece of said telescope, a source providing a highly collimated light beam means for mounting said source to said telescope, and routing optics attached to said source for selectively directing said light beam into the telescope eyepiece and into parallel alignment with the optic axis of said telescope so that said beam is thereby directed by said telescope between its reticle and said exact position, said routing optics further comprising means for permitting visual sighting through said telescope while said source is mounted to said telescope.

2. A surveying instrument as in claim 1 in which said routing optics comprises means forming an optical passageway having first and second ends, the first end being generally aligned with the light beam and the second end being generally aligned with the optic axis of said telescope, means disposed in said passageway for diverting the light beam into precise alignment with the optic axis of said telescope.

3. A surveying instrument as in claim 2 wherein said means for diverting the beam consists of a pair of reflectors, means mounting one of said reflectors at a position intersecting said light beam, means mounting the other said reflectors at a position spaced from said first reflector at a distance equal to the displacement between the light beam and the optic axis of said telescope.

4. A surveying instrument as in claim 3 wherein each of said reflectors consists of a mirror surface formed on spherical substrate and wherein said means for mounting said reflectors consists of mounting blocks having spherical recesses therein for receiving said substrates.

5. A surveying instrument as in claim 3 further including means positioned between said second reflector and said telescope for fine adjustment of the light beam through a solid angle to facilitate precise alignment of the beam with the telescope.

6. A surveying instrument as in claim 5 wherein said means for finely adjusting the direction of the beam consists of a pair of prisms and means mounting said prisms for independent rotation in spaced parallel planes such that the laser beam is transmitted through said prisms in series.

7. A laser surveying instrument comprising a telescope including a reticle for accurately aligning said telescope on an exact position at a remote location, to establish an optical sightline between said reticle and said location, said telescope conveying the image light from said remote location into a bundle of light rays emerging from the eyepiece of said telescope, a laser having a highly collimated output beam, means mounting said laser onto and alongside of said telescope, routing optics for selectively directing the light beam from said laser into parallel alignment with the optic axis of the telescope and into the telescope eyepiece, said routing optics including a pair of mounting blocks having a light passageway therein, a first portion of which extends in general alignment with the laser beam and a second portion of which extends on a line parallel to the optic axis of said telescope and spaced from said first portion a distance between said laser beam and the optic axis of said telescope, first and second reflecting means disposed in said passageways for reflecting the laser beam across said distance between said first and second portions, each of said reflecting means including a mirror surface formed on a spherical substrate, each of said mounting blocks having a spherical recess for receiving said substrate, each of said spherical recesses being located so that the mirror on the substrate supported therein intersects the optical path of the beam, means mounting said routing optics to said laser for rotation about said laser beam between a position in which the second reflecting means intercepts the optic axis of the telescope and a second position in which said entire routing optics is moved to a position out of the way of said telescope eyepiece to permit the taking of a conventional visual sight.

8. A laser surveying instrument comprising: a telescope including a reticle for accurately aligning said telescope on an exact position at a remote location to establish an optical sightline between said reticle and said location, said telescope conveying the image light from said remote location into a bundle of light rays emerging from the eyepiece of said telescope, a source of highly collimated light formed into a linear beam, routing optics for selectively directing said light beam into the telescope eyepiece and into parallel alignment with the optic axis of said telescope so that said beam is thereby directed by said telescope between its reticle and said exact position, and wherein said telescope includes a barrel and said source of collimating light is a laser, and further including means for mounting said laser to said barrel in generally parallel alignment therewith, and said mounting means comprises a pair of brackets secured to the telescope barrel and to the laser respectively including alignment means for establishing precise reproducible alignment between said brackets.

9. A surveying instrument as in claim 8 in which the brackets are provided with flat opposing surfaces and in which said alignment means include a precision bushing formed in one bracket and a pin set in the other, said bushing and pin being aligned so that when the pin is inserted into the bushing, the flat opposing surfaces of the brackets make supporting contact.

UNITED STATES PATENT OFFICE
CERTIFICATE OF CORRECTION

Patent No. 3,627,429           Dated December 14, 1971

Inventor(s) Richard A. Jaenicke & Raymond A. Evanson

It is certified that error appears in the above-identified patent and that said Letters Patent are hereby corrected as shown below:

| | |
|---|---|
| Col. 4, line 60, | Change "and tightened" to "are tightened". |
| Col. 5, line 5, | Between "lower" and "95", insert --surface--; |
| Col. 5, line 34, | Delete duplicate line in chart reading "500         0.4"; |
| Col. 5, line 39, | Between "each" and "5,000" (in chart) insert --additional--. |
| Col. 6, line 50, | Between "distance" and "between", insert --equal to the distance--. |

Signed and sealed this 6th day of June 1972.

(SEAL)
Attest:

EDWARD M. FLETCHER, JR.            ROBERT GOTTSCHALK
Attesting Officer                  Commissioner of Patents